United States Patent
Chang et al.

(10) Patent No.: US 11,978,929 B2
(45) Date of Patent: May 7, 2024

(54) CLOSE-END FUEL CELL AND ANODE BIPOLAR PLATE THEREOF

(71) Applicant: Industrial Technology Research Institute, Hsinchu (TW)

(72) Inventors: Sung-Chun Chang, Hsinchu (TW); Chien-Ming Lai, Hsinchu County (TW); Chiu-Ping Huang, Taoyuan (TW); Li-Duan Tsai, Hsinchu (TW); Keng-Yang Chen, Hsinchu County (TW)

(73) Assignee: Industrial Technology Research Institute, Hsinchu (TW)

( * ) Notice: Subject to any disclaimer, the term of this patent is extended or adjusted under 35 U.S.C. 154(b) by 68 days.

(21) Appl. No.: 17/408,509

(22) Filed: Aug. 23, 2021

(65) Prior Publication Data

US 2022/0271302 A1 Aug. 25, 2022

(30) Foreign Application Priority Data

Feb. 22, 2021 (TW) .................................. 110106100

(51) Int. Cl.
*H01M 8/0247* (2016.01)
*H01M 8/0232* (2016.01)
(Continued)

(52) U.S. Cl.
CPC ....... *H01M 8/0247* (2013.01); *H01M 8/0232* (2013.01); *H01M 8/0234* (2013.01); *H01M 8/0245* (2013.01); *H01M 8/0263* (2013.01)

(58) Field of Classification Search
CPC combination set(s) only.
See application file for complete search history.

(56) References Cited

U.S. PATENT DOCUMENTS

| 5,641,586 A | 6/1997 | Wilson |
| 7,112,385 B2 | 9/2006 | Rock |
| (Continued) | | |

FOREIGN PATENT DOCUMENTS

| CN | 100416902 | 9/2008 |
| CN | 102148387 | 8/2011 |
| (Continued) | | |

OTHER PUBLICATIONS

"Office Action of Japan Counterpart Application", dated Oct. 25, 2022, p. 1-p. 2.
(Continued)

*Primary Examiner* — Ula C Ruddock
*Assistant Examiner* — Sarika Gupta
(74) *Attorney, Agent, or Firm* — JCIPRNET

(57) ABSTRACT

A close-end fuel cell and an anode bipolar plate thereof are provided. The anode bipolar plate includes an airtight conductive frame and a conductive porous substrate disposed within the airtight conductive frame. In the airtight conductive frame, an edge of a first side has a fuel inlet, and an edge of a second side has a fuel outlet. The conductive porous substrate has at least one flow channel, where a first end of the flow channel communicates with the fuel inlet, a second end of the flow channel communicates with the fuel outlet. The flow channel is provided with a blocking part near the fuel inlet to divide the flow channel into two areas.

14 Claims, 5 Drawing Sheets

(51) Int. Cl.
    *H01M 8/0234*      (2016.01)
    *H01M 8/0245*      (2016.01)
    *H01M 8/0263*      (2016.01)

(56) References Cited

U.S. PATENT DOCUMENTS

| | | | |
|---|---|---|---|
| 8,715,871 | B2 | 5/2014 | Callahan et al. |
| 2003/0129468 | A1 | 7/2003 | Issacci et al. |
| 2011/0207004 | A1 | 8/2011 | Darling et al. |
| 2013/0101914 | A1* | 4/2013 | Takeshita .......... H01M 8/04156 |
| | | | 429/480 |

FOREIGN PATENT DOCUMENTS

| | | |
|---|---|---|
| CN | 103053057 | 4/2013 |
| CN | 103390759 | 11/2013 |
| CN | 203760565 | 8/2014 |
| CN | 106165176 | 11/2016 |
| CN | 109935852 | 6/2019 |
| DE | 102008034545 | 2/2010 |
| JP | 2004253366 | 9/2004 |
| JP | 2005322595 | 11/2005 |
| JP | 2006331916 | 12/2006 |
| JP | 2020136218 | 8/2020 |
| TW | 200633295 | 9/2006 |
| TW | 273730 | 2/2007 |
| WO | WO-0022689 A1 * | 4/2000 .......... H01M 8/0204 |
| WO | 2005109556 | 11/2005 |
| WO | 2008096650 | 8/2008 |
| WO | 2012007998 | 1/2012 |

OTHER PUBLICATIONS

"Office Action of Taiwan Counterpart Application", dated Oct. 7, 2021, p. 1-p. 8.

"Office Action of China Counterpart Application", dated Dec. 20, 2023, p. 1-p. 7.

* cited by examiner

CLOSE-END FUEL CELL AND ANODE BIPOLAR PLATE THEREOF

CROSS-REFERENCE TO RELATED APPLICATION

This application claims the priority benefit of Taiwan application serial no. 110106100, filed on Feb. 22, 2021. The entirety of the above-mentioned patent application is hereby incorporated by reference herein and made a part of this specification.

TECHNICAL FIELD

The technical field relates to a close-end fuel cell and an anode bipolar plate thereof.

BACKGROUND

The closed-end fuel cell is an anode-closed cell system which omits part of auxiliary systems (such as recycling and temperature control equipment) so that the battery system is significantly simplified to make the structure more compact and suitable for mobile devices. Currently, it is one of the core areas for fuel cell development.

The flow channel in the close-end fuel cell is designed for maximizing the reaction efficiency and maintaining stable reaction/output. Maximization of the reaction efficiency is mainly achieved by evenly distributing the fuel in the active area (catalyst layer), and maintenance of stable reaction/output requires the dynamic balance of reaction at a triple point (i.e., for solid, liquid, and gas phases) for even distribution of the fuel.

Traditionally, serpentine or straight flow channels are formed by molding/turning graphite or metal bipolar plates. However, since the structure of these bipolar plates has no pores, the fuel to be transported from the flow channels to the active area between the flow channels is required to diffuse horizontally from the flow channels to the gas diffusion layer in the membrane electrode assembly before reaching the active area, which leads to a significant gradient of fuel concentration and makes it unlikely to evenly distribute the fuel.

Another method involves replacing the bipolar plates having flow channels with a whole plate of conductive porous material so that the fuel may diffuse over the surface of the active area through the pores of the porous material without causing a significant concentration gradient. However, this design lacks a main guiding flow channel like a serpentine flow channel, making it difficult to predict the flow trajectory of the fuel after the fuel is introduced. Moreover, the small pores of the conductive porous material also increase the resistance of fuel transportation, so that moisture or other fluid in the product may be stuck therein and cannot be easily removed. Therefore, as the moisture in the product begins to block some of the porous flow channels, the proportion of the effective active area will be gradually reduced, which causes a decrease in reaction/output at the same time and further results in poor operation stability in a long term.

On the other hand, in some studies, parallel or branching interdigitated flow channels are designed and disposed in the conductive porous material. However, the use of parallel or branching interdigitated flow channels in the porous material divides the flow of the fuel twice and results in uneven distribution of the fuel in different flow channels. As a result, flooding and blockage may occur in flow channels with a smaller flow rate, which further reduces the reaction/output of the corresponding active area.

SUMMARY

An anode bipolar plate of a close-end fuel cell of an exemplary embodiment of the disclosure includes an airtight conductive frame and a conductive porous substrate. The edge of a first side of the airtight conductive frame has a fuel inlet, and the edge of a second side of the airtight conductive frame has a fuel outlet. The conductive porous substrate is disposed in the airtight conductive frame. The conductive porous substrate has at least one flow channel, in which a first end of the flow channel communicates with the fuel inlet and a second end of the flow channel communicates with the fuel outlet. The flow channel is disposed with a blocking part near the fuel inlet to divide the flow channel into two areas.

A close-end fuel cell of an exemplary embodiment of the disclosure includes a membrane electrode assembly, the above anode bipolar plate, and a cathode bipolar plate. The membrane electrode assembly has an anode side and a cathode side. The anode bipolar plate is disposed on the anode side of the membrane electrode assembly. The cathode bipolar plate is disposed on the cathode side of the membrane electrode assembly.

Several exemplary embodiments accompanied with figures are described in detail below to further describe the disclosure in details.

DESCRIPTION OF THE EMBODIMENTS

Figure 1A:
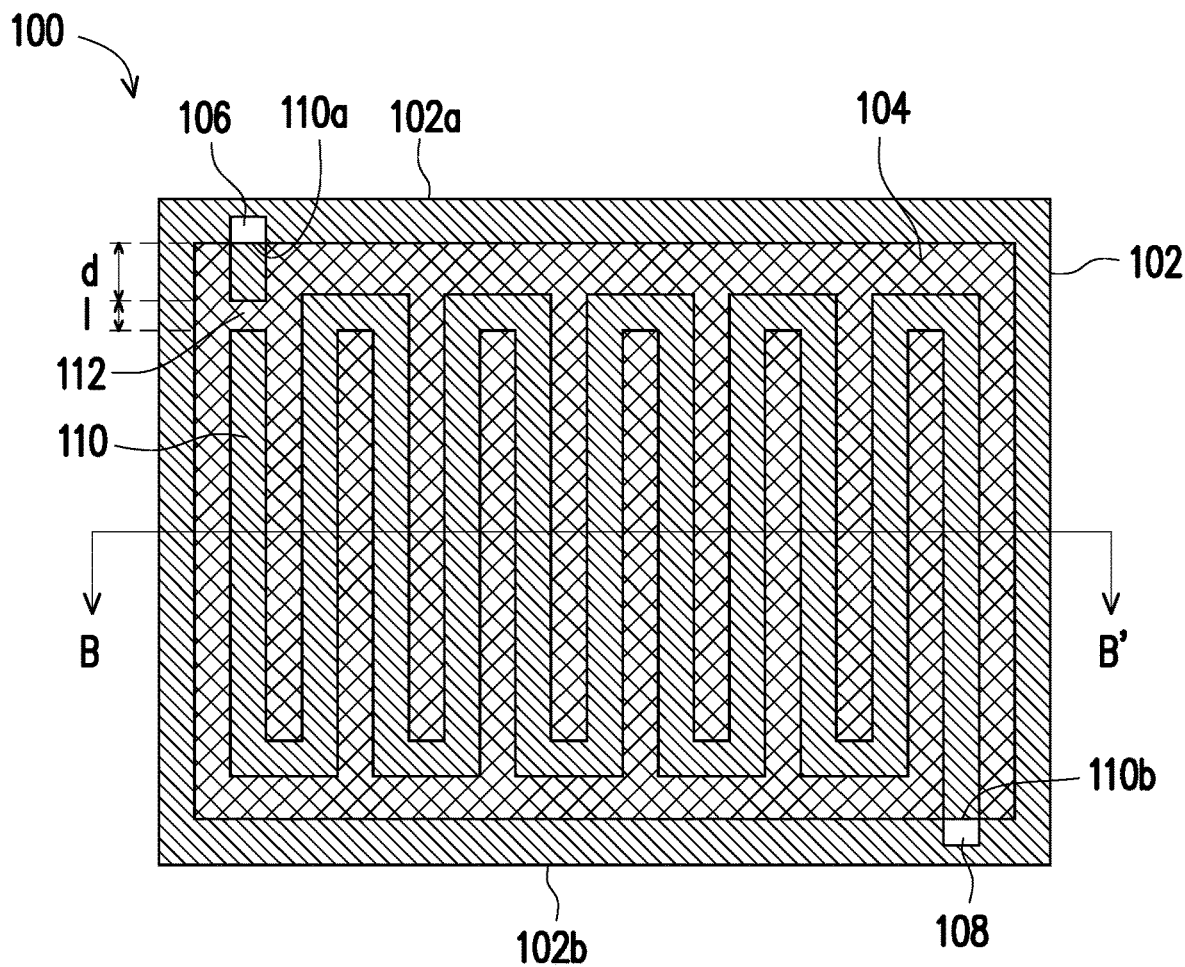
FIG. 1A is a schematic top view of an anode bipolar plate of a close-end fuel cell according to a first embodiment of the disclosure.

An exemplary embodiment of the disclosure provides an anode bipolar plate of a close-end fuel cell which exhibits convenience in manufacturing and processing and can satisfy the requirements for maximizing the reaction efficiency and maintaining stable reaction/output at the same time.

Another exemplary embodiment of the disclosure provides a close-end fuel cell which exhibits excellent reaction efficiency and can maintain stable reaction/output.

With the design of the flow channel of the disclosure, it is possible to optimize the reaction efficiency, maintain stable reaction/output, keep the thickness of the flow channel/flow channel material and the impedance unchanged, and achieve convenience in manufacturing and processing.

Exemplary embodiments of the disclosure will be comprehensively described below with reference to the drawings, but the disclosure may still be implemented in many different forms and should not be construed as limited to the embodiments set forth herein. In the drawings, for clarity, the size and thickness of each area, part, and layer may not be drawn to actual scale.

Figure 1B:
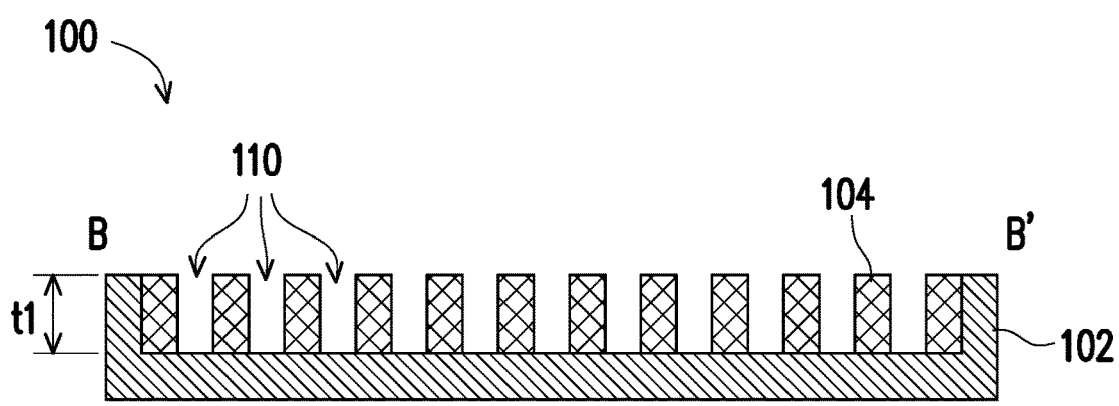
FIG. 1B is a schematic cross-sectional view along a line segment B-B' of FIG. 1A.

FIG. 1A is a schematic top view of an anode bipolar plate of a close-end fuel cell according to a first embodiment of the disclosure. FIG. 1B is a schematic cross-sectional view along a line segment B-B' of FIG. 1A.

With reference to FIG. 1A and FIG. 1B, an anode bipolar plate 100 of the close-end fuel cell of the first embodiment includes an airtight conductive frame 102 and a conductive porous substrate 104. An edge of a first side 102a of the airtight conductive frame 102 has a fuel inlet 106, and an edge of a second side 102b of the airtight conductive frame 102 has a fuel outlet 108. A material of the airtight conductive frame 102 is, for example, a metal, a conductive graphite, a conductive ceramic, or a composite of the above materials. In an embodiment, the first side 102a and the second side 102b of the airtight conductive frame 102 are opposite sides. In other embodiments, the first side 102a and the second side 102b may be adjacent sides, and the disclosure is not limited to the above. The conductive porous substrate 104 is disposed in the airtight conductive frame 102, and a material of the conductive porous substrate 104 is, for example, a carbon-based material, a metal material, a conductive plastic material, or a combination of the above. The conductive porous substrate 104 has at least one flow channel 110. A first end 110a of the flow channel 110 communicates with the fuel inlet 106 and a second end 110b of the flow channel 110 communicates with the fuel outlet 108. This embodiment describes one single flow channel 110 as an example, and the single flow channel 110 is a serpentine flow channel, but the disclosure is not limited thereto. The single flow channel 110 is disposed with a blocking part 112 near the fuel inlet 106 (that is, at the first end 110a of the flow channel 110) to divide the flow channel 110 into two areas, and a distance d between the blocking part 112 and the fuel inlet 106, for example, accounts for 0 to 40% of the total length of the corresponding flow channel 110. In an embodiment, the distance d may account for 0 to 20% of the total length of the corresponding flow channel 110. A length l of the blocking part 112, for example, accounts for 0.1% to 1% of the total length of the corresponding flow channel 110. A thickness of the blocking part 112 is, for example, equal to a thickness t1 of the conductive porous substrate 104 (in the portion other than the flow channel 110).

Since the conductive porous substrate 104 of the anode bipolar plate 100 in the first embodiment has the flow channel 110, the flow resistance of communication is small, and the product (such as water vapor) of the close-end fuel cell may be effectively removed from an active area (a membrane electrode assembly). In addition, the conductive porous substrate 104 is a porous material, so the fuel may diffuse over the surface of the active area through pores of the conductive porous substrate 104 to improve the concentration gradient. Since the blocking part 112 in the flow channel 110 of the anode bipolar plate 100 is near the fuel inlet 106 (that is, at the first end 110a of the flow channel 110), the close-end fuel cell having the anode bipolar plate 100 may maximize the reaction efficiency and maintain stable reaction/output. In addition, the flow channel 110 may be made from hollowing out the conductive porous substrate 104 by mechanical processing, and the blocking part 112 may be used to maintain the integrity of the conductive porous substrate 104, which facilitates the combination of the conductive porous substrate 104 in the airtight conductive frame 102. Therefore, the anode bipolar plate 100 of the first embodiment exhibits advantages such as convenience in manufacturing and processing.

Figure 2:
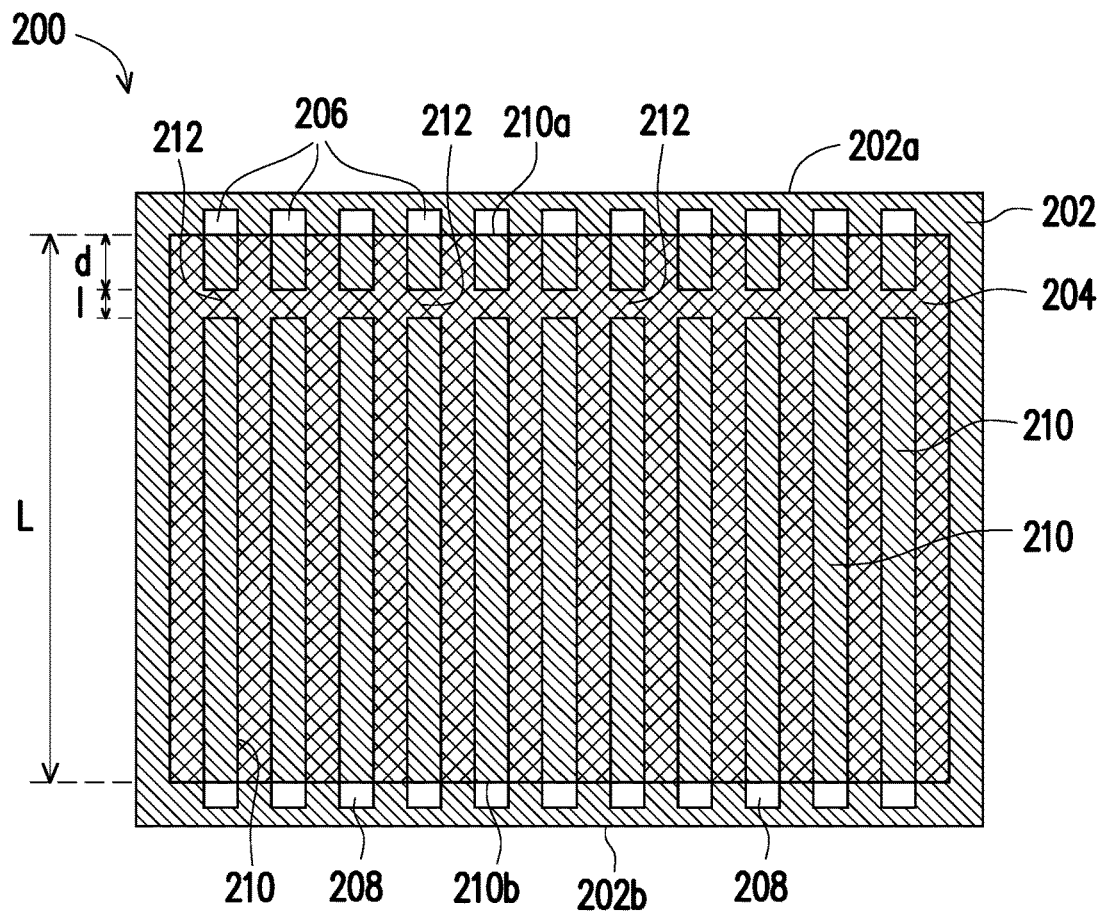
FIG. 2 is a schematic top view of an anode bipolar plate of a close-end fuel cell according to a second embodiment of the disclosure.

FIG. 2 is a schematic top view of an anode bipolar plate of a close-end fuel cell according to a second embodiment of the disclosure.

With reference to FIG. 2, an anode bipolar plate 200 of the close-end fuel cell of the second embodiment includes an airtight conductive frame 202 and a conductive porous substrate 204. In this embodiment, an edge of a first side 202a of the airtight conductive frame 202 has multiple fuel inlets 206, and an edge of a second side 202b of the airtight conductive frame 202 has multiple fuel outlets 208. As shown in FIG. 2, the conductive porous substrate 204 disposed in the airtight conductive frame 202 in this embodiment has multiple flow channels 210, for example, and each of the flow channels 210 is a straight flow channel. In this embodiment, the first side 202a and the second side 202b of the airtight conductive frame 202 are opposite sides, but in other embodiments, the first side 202a and the second side 202b may be adjacent sides. The multiple flow channels 210 may also be designed as serpentine or curved flow channels, but the disclosure is not limited thereto. A material of the conductive porous substrate 204 is, for example, a carbon-based material, a metal material, a conductive plastic material, or a combination of the above. In the conductive porous substrate 204, a first end 210a of each of the flow channels 210 communicates with one of the fuel inlets 206 and a second end 210b of each of the flow channels 210 communicates with one of the fuel outlets 208. As described in the first embodiment, each of the flow channels 210 is disposed with a blocking part 212 near the fuel inlet 206 to divide the corresponding flow channel 210 into two areas, and a distance d between the blocking part 212 and the fuel inlet 206, for example, accounts for 0 to 40% of a total length L of the corresponding flow channel 210. In an embodiment, the distance d may account for 0 to 20% of the total length L of the corresponding flow channel 210. A length l of the blocking part 212, for example, accounts for 0.1% to 1% of the total length L of the corresponding flow channel 210.

Since the conductive porous substrate 204 of the anode bipolar plate 200 in the second embodiment has the multiple flow channels 210, the flow resistance of communication is small, and since the conductive porous substrate 204 is a porous material, the fuel may diffuse over the surface of the active area through pores of the conductive porous substrate 204 to reduce the concentration gradient. The blocking part 212 in each of the flow channels 210 is disposed near the fuel inlet 206 such that the close-end fuel cell having the anode bipolar plate 200 may maximize the reaction efficiency and maintain stable reaction/output. In addition, the blocking parts 212 maintain the integrity of the conductive porous substrate 204, which facilitates the combination of the conductive porous substrate 204 in the airtight conductive frame 202. Therefore, the anode bipolar plate 200 of the second embodiment also exhibits advantages such as convenience in manufacturing and processing.

Figure 3A:
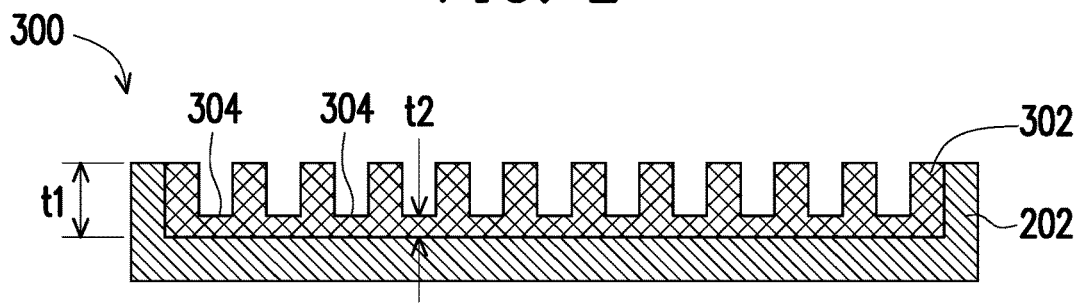
FIG. 3A is a schematic side view of an anode bipolar plate of a close-end fuel cell according to a third embodiment of the disclosure.

FIG. 3A is a schematic side view of an anode bipolar plate of a close-end fuel cell according to a third embodiment of the disclosure, in which the same reference numerals as in the second embodiment are used to denote the same or similar components. Moreover, for descriptions of the same or similar components, reference may be made to the relevant descriptions in the second embodiment, so details thereof are not described herein.

With reference to FIG. 3A, an anode bipolar plate 300 of the close-end fuel cell in the third embodiment is substantially the same as that in the second embodiment, but a thickness t2 of blocking parts 304 in a conductive porous substrate 302 is smaller than a thickness t1 of the conductive porous substrate 302 (in the portion other than the flow channel). In other words, FIG. 3A is a schematic cross-sectional view taken along a line segment corresponding to the line segment passing through the blocking parts 212 in FIG. 2, meaning that each of the blocking parts 304 is a recess in the conductive porous substrate 302 without cutting through the conductive porous substrate 302.

Figure 3B:
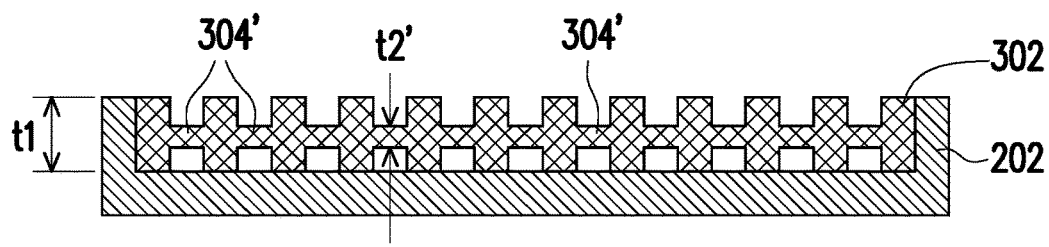
FIG. 3B is a schematic side view of a modified example of the third embodiment.

FIG. 3B is a schematic side view of a modified example of the third embodiment. In FIG. 3B, a thickness t2' of blocking parts 304' is also smaller than the thickness t1 of the conductive porous substrate 302 (in the portion other than the flow channel), but the blocking parts 304' are not in contact with the airtight conductive frame 202. According to the above embodiments, the blocking parts 304 and 304' may be configured to partially block the flow channels 210 and are not limited to completely blocking the communication of the flow channels 210.

Figure 4:
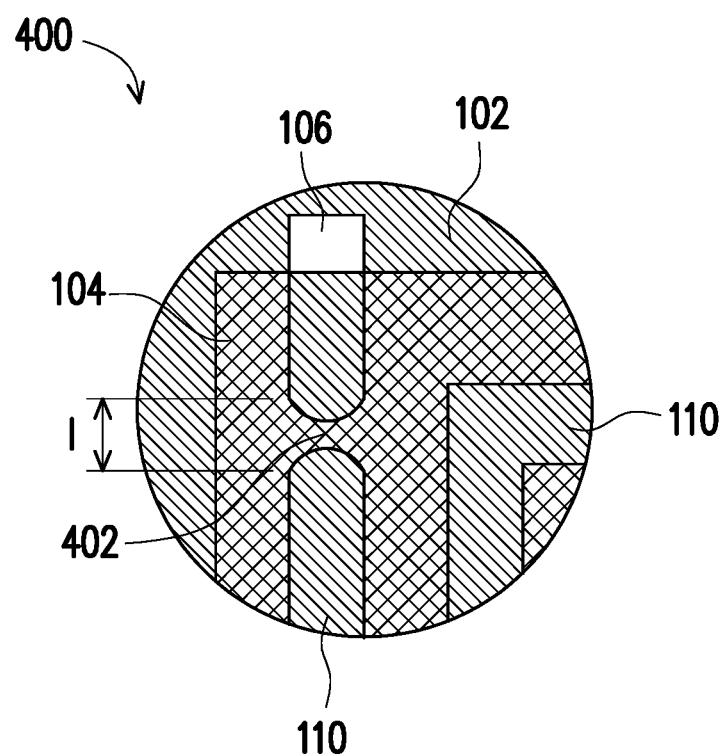
FIG. 4 is a partial enlarged schematic top view of an anode bipolar plate of a close-end fuel cell according to a fourth embodiment of the disclosure.

FIG. 4 is a partial enlarged schematic top view of an anode bipolar plate of a close-end fuel cell according to a fourth embodiment of the disclosure, in which the same reference numerals as in the first embodiment are used to denote the same or similar components. Moreover, for descriptions of the same or similar components, reference may be made to the relevant descriptions in the first embodiment, so details thereof are not described herein.

With reference to FIG. 4, an anode bipolar plate 400 of the close-end fuel cell in the fourth embodiment is substantially the same as that in the first embodiment, but a length l of a blocking part 402 gradually decreases from the edge to the middle of the flow channel 110 to further reduce the flow resistance.

Figure 5:
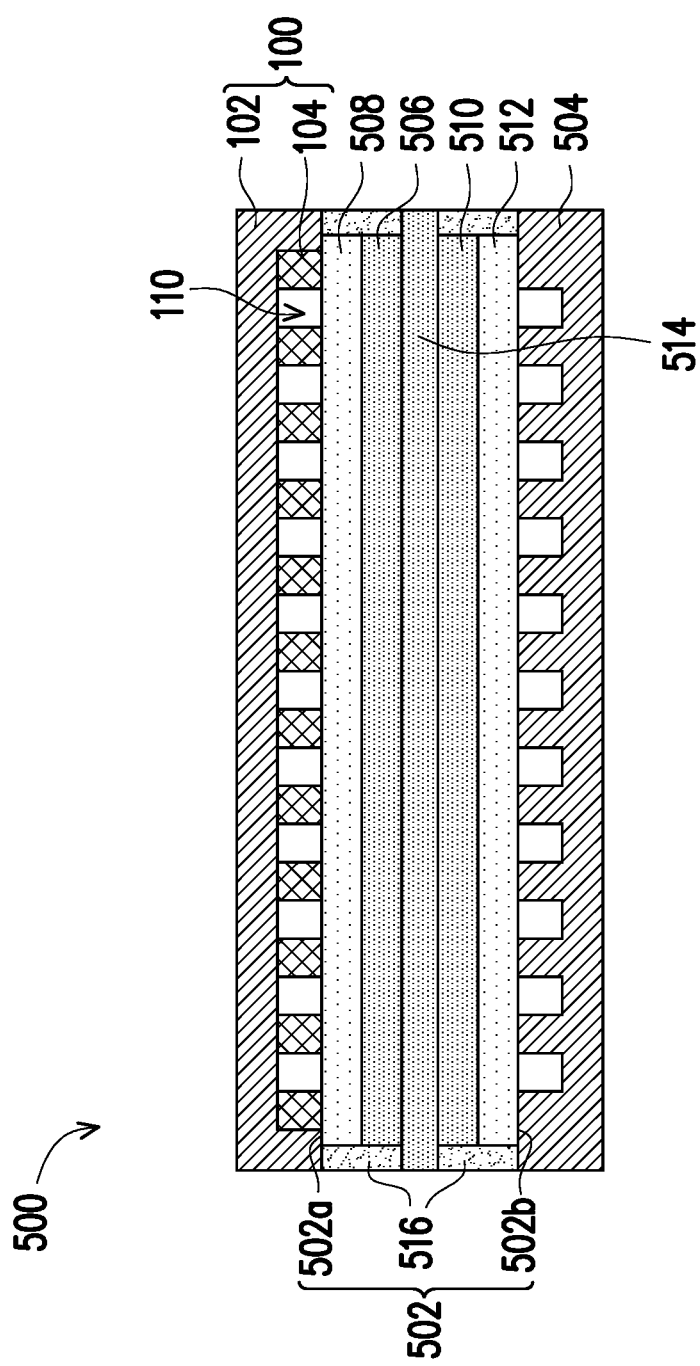
FIG. 5 is a schematic cross-sectional view of a close-end fuel cell according to a fifth embodiment of the disclosure.

FIG. 5 is a schematic cross-sectional view of a close-end fuel cell according to a fifth embodiment of the disclosure.

With reference to FIG. 5, a close-end fuel cell 500 of the fifth embodiment includes a membrane electrode assembly 502, an anode bipolar plate 100, and a cathode bipolar plate 504, and the anode bipolar plate 100 is the anode bipolar plate in the first embodiment. In this embodiment, the same reference numerals as in the first embodiment are used to denote the same or similar components. Moreover, for descriptions of the same or similar components, reference may be made to the relevant descriptions in the first embodiment, so details thereof are not described herein. However, the anode bipolar plate 100 may also be replaced with any anode bipolar plate in the second to fourth embodiments. The membrane electrode assembly 502 has an anode side 502a and a cathode side 502b opposite to each other. The anode bipolar plate 100 is disposed on the anode side 502a and the cathode bipolar plate 504 is disposed on the cathode side 502b. The membrane electrode assembly 502 includes an anode electrode layer 506 and an anode gas diffusion layer 508 on the anode side 502a, and the anode gas diffusion layer 508 is in contact with the anode bipolar plate 100. The membrane electrode assembly 502 includes a cathode electrode layer 510 and a cathode gas diffusion layer 512 on the cathode side 502b. Furthermore, there is an ion conducting membrane 514 between the anode side 502a and the cathode side 502b. In addition to the above components, the close-end fuel cell 500 may further include other parts as required, such as a sealing member 516 for sealing, but the disclosure is not limited to the above.

Several experiments are described below to verify the effect of the disclosure, but the disclosure is not limited to the following content.

EXPERIMENTAL EXAMPLES 1 TO 6

The anode bipolar plate as shown in the first embodiment was manufactured, and the active area of its power generation cell is 45 cm$^2$. The length of the blocking part of the anode bipolar plate accounts for 0.5% of the total length of the corresponding flow channel, and the thickness of the blocking part is the same as the thickness of the conductive porous substrate. However, the distance between the blocking part and the fuel inlet is different among the experimental examples. In Experiment Example 1, since the blocking part is located right at the fuel inlet, the distance between the blocking part and the fuel inlet accounts for 0% of the total length of the corresponding flow channel. In Experiment Example 2, the distance between the blocking part and the fuel inlet accounts for 5% of the total length of the corresponding flow channel. In Experiment Example 3, the distance between the blocking part and the fuel inlet accounts for 10% of the total length of the corresponding flow channel. In Experiment Example 4, the distance between the blocking part and the fuel inlet accounts for 20% of the total length of the corresponding flow channel. In Experiment Example 5, the distance between the blocking part and the fuel inlet accounts for 30% of the total length of the corresponding flow channel. In Experiment Example 6, the distance between the blocking part and the fuel inlet accounts for 40% of the total length of the corresponding flow channel.

The power generation cells of this design were assembled to form a ten-cell short stack. After full activation, hydrogen was introduced into the anode and air was introduced into the cathode. Discharge was carried out at a constant voltage for 120 minutes. The current/power values and change trends during the discharge process were measured and shown in FIG. 6.

EXPERIMENTAL EXAMPLE 7

The anode bipolar plate was manufactured in the same way as in Experimental Example 3. The difference is that the length of the blocking part accounts for 1% of the total length of the corresponding flow channel.

The power generation cells of this design were assembled to form a ten-cell short stack. After full activation, hydrogen was introduced into the anode and air was introduced into the cathode. Discharge was carried out at a constant voltage for 120 minutes. The current/power values and change trends during the discharge process were measured and shown in FIG. 6.

COMPARATIVE EXAMPLE

A conductive porous substrate was hollowed to form two interdigitated flow channels alternating with each other. One of the flow channels communicates with the fuel inlet on the edge of one side of the conductive porous substrate, and the other of the flow channels communicates with the fuel outlet on the edge of the opposite side, and no blocking part is disposed in the flow channels.

Afterwards, a ten-cell short stack was assembled in the same way as in Experimental Example 1. After full activation, hydrogen was introduced into the anode and air was introduced into the cathode. Discharge was carried out at a constant voltage for 120 minutes. The current/power values and change trends during the discharge process were measured and shown in FIG. 6.

Figure 6:
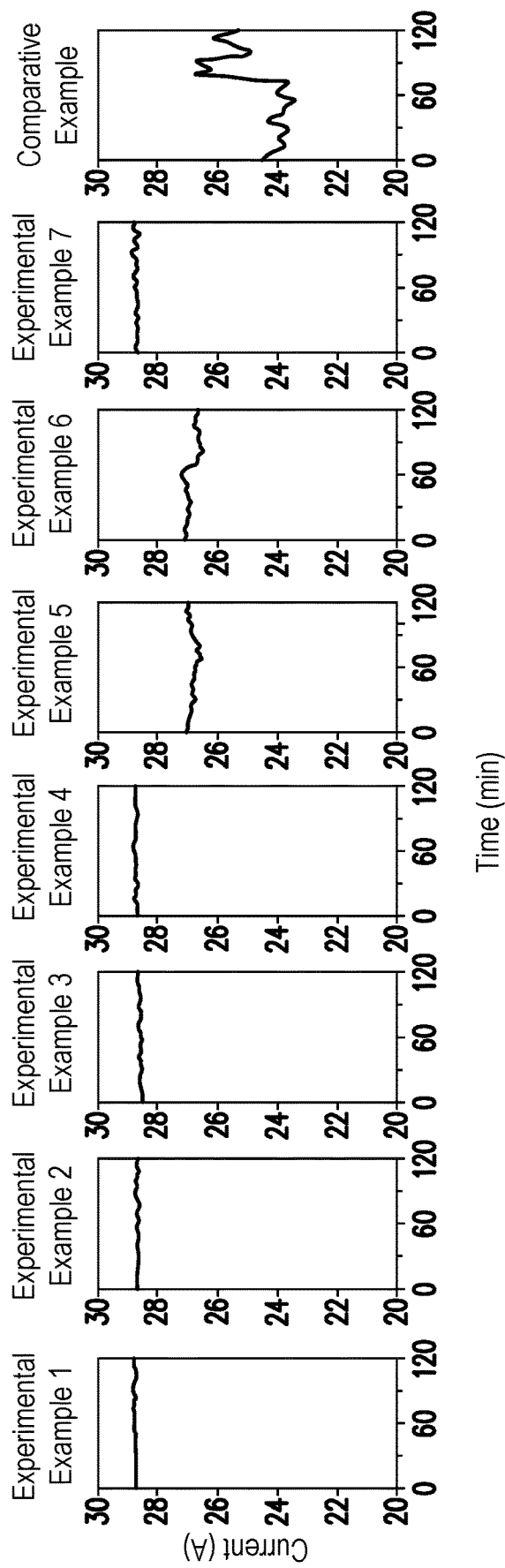
FIG. 6 is a view of current change curves of Experimental Examples 1 to 7 and Comparative Example during the discharge process.

It may be seen from FIG. 6 that the reaction/output of Experimental Examples 1 to 7 was more stable than that of Comparative Example. Moreover, the stack currents of Experimental Examples 1 to 4 were almost identical and were higher than those of the other experimental examples, thus exhibiting better discharging stability.

In summary of the above, the flow channel structure in the anode bipolar plate of the disclosure is embedded in the airtight conductive frame with gas barrier properties, and the blocking part is disposed near the fuel inlet. Therefore, the anode end of the close-end fuel cell is less prone to flooding, and the fuel/moisture at most penetrates the conductive porous substrate only once before it reaches the fuel outlet. Accordingly, the improved design exhibits advantages such as optimizing the reaction efficiency, maintaining stable reaction/output, and controlling the thickness of the flow channel/flow channel material.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. An anode bipolar plate of a close-end fuel cell, comprising:
   an airtight conductive frame, wherein an edge of a first side of the airtight conductive frame has a fuel inlet, and an edge of a second side of the airtight conductive frame has a fuel outlet; and
   a conductive porous substrate, disposed in the airtight conductive frame, wherein the conductive porous substrate has a plurality of flow channels, wherein a first end of each of the flow channels communicates with the fuel inlet, a second end of each of the flow channels communicates with the fuel outlet, and all of the flow channels have at least one blocking part near the fuel inlet to divide a corresponding one of the flow channels into two areas.

2. The anode bipolar plate of the close-end fuel cell according to claim 1, wherein a thickness of the blocking part is smaller than or equal to a thickness of the conductive porous substrate.

3. The anode bipolar plate of the close-end fuel cell according to claim 1, wherein a distance between the blocking part and the fuel inlet is zero distance or accounts for 40% or less of a total length of the corresponding one of the flow channels.

4. The anode bipolar plate of the close-end fuel cell according to claim 1, wherein a distance between the blocking part and the fuel inlet is zero distance or accounts for 20% or less of a total length of the corresponding one of the flow channels.

5. The anode bipolar plate of the close-end fuel cell according to claim 1, wherein a length of the blocking part is 0.1% to 1% of a total length of the corresponding one of the flow channels.

6. The anode bipolar plate of the close-end fuel cell according to claim 1, wherein a length of the blocking part decreases from an edge to a middle of the at least one flow channel.

7. The anode bipolar plate of the close-end fuel cell according to claim 1, wherein the flow channel is a serpentine flow channel.

8. The anode bipolar plate of the close-end fuel cell according to claim 1, wherein the at least one flow channel is a plurality of flow channels, and each of the plurality of flow channels is a straight flow channel.

9. The anode bipolar plate of the close-end fuel cell according to claim 1, wherein the first side of the airtight conductive frame and the second side of the airtight conductive frame are opposite sides.

10. The anode bipolar plate of the close-end fuel cell according to claim 1, wherein a material of the conductive porous substrate comprises a carbon-based material, a metal material, a conductive plastic material, or a combination of the above materials.

11. A close-end fuel cell, comprising:
    a membrane electrode assembly having an anode side and a cathode side;
    the anode bipolar plate according to claim 1, disposed on the anode side of the membrane electrode assembly; and
    a cathode bipolar plate disposed on the cathode side of the membrane electrode assembly.

12. The close-end fuel cell according to claim 11, wherein the membrane electrode assembly comprises an anode electrode layer and an anode gas diffusion layer on the anode side, and the anode gas diffusion layer is in contact with the anode bipolar plate.

13. The close-end fuel cell according to claim 11, wherein the membrane electrode assembly comprises an ion conducting membrane disposed between the anode side and the cathode side.

14. The close-end fuel cell according to claim 11, wherein the membrane electrode assembly comprises a cathode electrode layer and a cathode gas diffusion layer on the cathode side.

* * * * *